Aug. 16, 1932.　　　F. E. EPPICH　　　1,871,971
FISH LURE
Filed Aug. 25, 1931
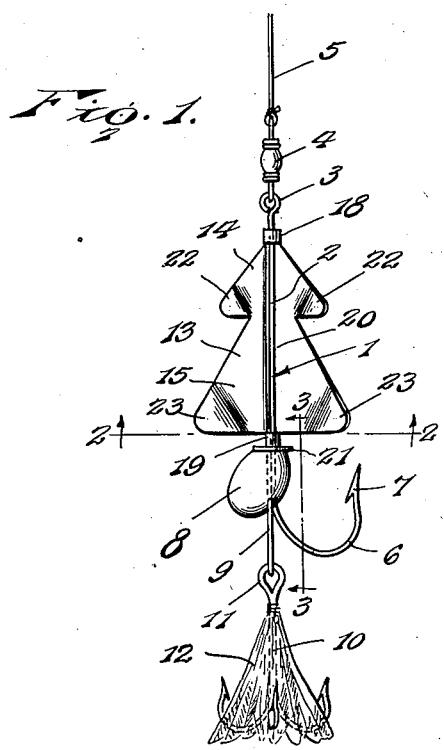
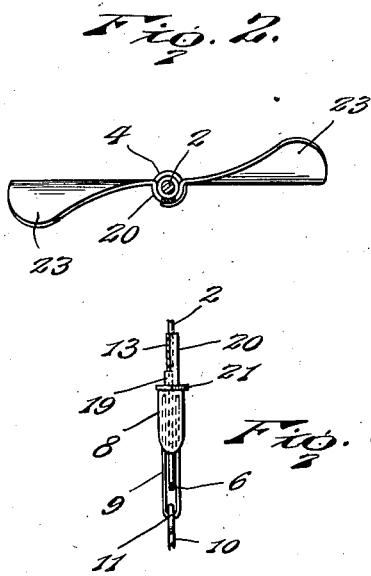
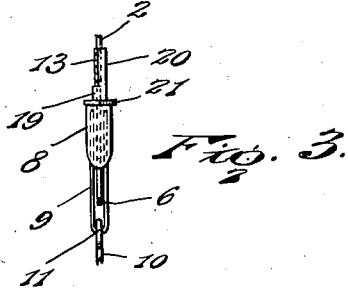
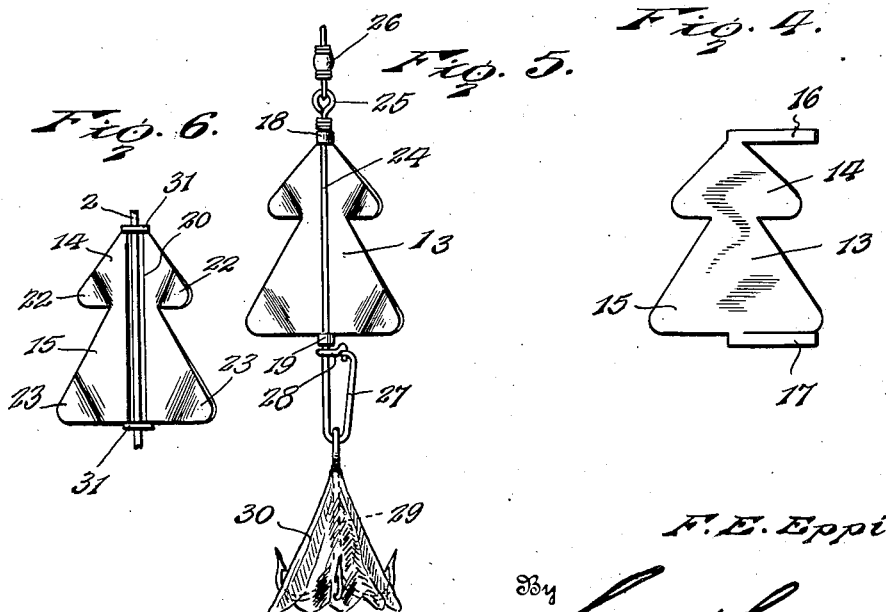
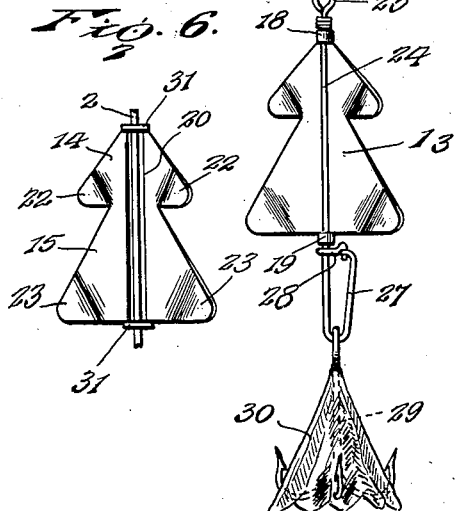
Inventor
F. E. Eppich.
By Lacey & Lacey, Attorneys Patented Aug. 16, 1932

1,871,971

UNITED STATES PATENT OFFICE

FREDERICK E. EPPICH, OF NORWOOD, MASSACHUSETTS

FISH LURE

Application filed August 25, 1931. Serial No. 559,258.

This invention relates to fishing and trapping and more particularly to an artificial bait for use when casting or trolling for fish.

One object of the invention is to provide an artificial bait having a hook and a spinner which is of a special shape and so formed that it may rotate very easily and very rapidly when the bait is drawn through water and thus attract the fish which it is desired to catch.

Another object of the invention is to provide a spinner which may be stamped from sheet metal and then have portions bent to form blades for causing it to rotate and other portions bent to form eyes for rotatably mounting the spinner. It will thus be seen that the spinner may be cheaply produced.

Another object of the invention is to provide a device of this character wherein the main hook carries a weight which in addition to serving as a weight also serves as a mounting for an eye or loop to which a snag hook is attached.

The invention is illustrated in the accompanying drawing, wherein:

Figure 1 is a view showing the improved fish lure or artificial bait in elevation, Figure 2 is a transverse sectional view taken along the line 2—2 of Figure 1, Figure 3 is a fragmentary view taken along the line 3—3 of Figure 1, Figure 4 is a view of the blank from which the spinner is formed, Figure 5 is a side elevation of a modified form of the invention, and Figure 6 is a view of another modified form of spinner.

The main hook 1 forming an element of the improved artificial bait has the usual shank 2 formed at one end with an eye 3 to engage a swivel 4 having a fish line 5 tied thereto and at the other end of the shank is provided the usual bill 6 terminating in a barb 7.

A weight 8 which may be formed of lead, solder or any other desired material is molded about the lower portion of the shank 2 and a loop or eye 9 has the upper end portions of its arms embedded in the weight. Therefore this loop will be firmly held in place and a snagging hook 10 which has its eye 11 engaged with the loop will be prevented from accidentally becoming detached. This snagging hook may have its shank and bills encased in feathers, bucktail or any other desired material as shown at 12 and represents the tail of a fish when the bait is drawn through water.

The spinner 13 which extends longitudinally of the shank 2 between the weight 8 and the eye 3 is formed from a sheet metal blank shown in Figure 4. The spinner is substantially triangular in shape but has its side edges so cut that upper and lower portions 14 and 15 are provided, each of which is substantially triangular, but the lower portion is of greater dimensions than the upper portion.

Tongues 16 and 17 which extend transversely of the blank are provided at upper and lower ends thereof and these tongues are rolled longitudinally upon themselves to form eyes 18 and 19 which engage about the shank 2 and rotatably mount the spinner upon the shank. It should also be noted that the blank is crimped longitudinally at the center thereof to form a trough or seat 20 in which the shank is seated. Therefore the spinner will be very well mounted and balanced and since the lower eye 19 rests upon a washer 21 it may rotate freely and turn rapidly when the bait is drawn through water. Lower corners of the triangular upper and lower portions 14 and 15 are bent to form blades 22 and 23 and since the blades of each set extend in opposite directions as shown in Figure 2, they will serve to impart rotary motion to the spinner. It will thus be seen that when the bait is drawn through water the spinner will be rapidly rotated and since the hook 10 and its covering 12 may move transversely, the bait will closely resemble a swimming fish and light will be reflected from the spinner similar to the manner in which light is reflected from the sides of a swimming fish.

In Figure 5 there has been shown a bait of a slightly modified construction. In this form the spinner 23 is similar to the spinner 13 except that the trough 20 has been omitted. This spinner is rotatably engaged about a shank 24 formed of stiff wire having an eye 25 at its upper end engaged with a swivel 26 corresponding to the swivel 4.

The lower end portion of the strand of wire from which the shank is formed is bent back upon itself to form an eye or loop 27, the outer arm of which has its upper end engaged about the shank as shown at 28 and this loop carries a snagging hook 29 which is similar to hook 10 and is covered as shown at 30 by a covering which corresponds to the covering 12 of the hook 10.

The operation of this form of artificial bait is similar to that previously described, but since the weight 8 is omitted it will remain closer to the surface of the water.

The spinnner shown in Fig. 6 is if the same construction as that shown in Fig. 1 except that the upper and lower eyes 31 which take the place of the eyes 18 and 19 instead of being formed from tongues extending transversely of the spinner, as shown in Fig. 4, merely consist of perforated tongues bent into position to receive the shank 2.

What is claimed is:

1. A fish lure comprising a shank, a hook at one end of said shank, and a spinner carried by said shank and consisting of a plate extending longitudinally of the shank and projecting from opposite sides thereof, said plate having tongues extending transversely thereof and bent to form eyes engaged about the shank to rotatably connect the plate with the shank, portions of the plate being bent to form blades disposed at opposite sides of the shank for imparting rotary motion to the spinner.

2. A fish lure comprising a shank, a hook at one end of said shank, and a spinner carried by said shank and consisting of a plate extending longitudinally of the shank and projecting from opposite sides thereof, said plate being crimped intermediate its width to form a longitudinally extending seat receiving said shank and tongues extending transversely of the plate at ends thereof and bent to form eyes engaged about the shank to rotatably connect the plate with the shank, portions of the plate being bent to form blades disposed at opposite sides of the shank for imparting rotary motion to the spinner.

In testimony whereof I affix my signature.

FREDERICK E. EPPICH. [L. S.]